(12) United States Patent
Roche et al.

(10) Patent No.: US 11,218,877 B2
(45) Date of Patent: *Jan. 4, 2022

(54) AUTO-PROVISIONING DEVICE

(71) Applicant: Amazon Technologies, Inc., Seattle, WA (US)

(72) Inventors: Kyle Michael Roche, Mercer Island, WA (US); James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,930

(22) Filed: May 17, 2019

(65) Prior Publication Data

US 2019/0274050 A1 Sep. 5, 2019

Related U.S. Application Data

(63) Continuation of application No. 15/912,226, filed on Mar. 5, 2018, now Pat. No. 10,306,473, which is a
(Continued)

(51) Int. Cl.

| | |
|---|---|
| *H04W 4/70* | (2018.01) |
| *H04W 12/08* | (2021.01) |
| *H04L 12/24* | (2006.01) |
| *H04W 12/06* | (2021.01) |
| *H04W 8/22* | (2009.01) |
| *H04W 8/24* | (2009.01) |
| *H04W 12/30* | (2021.01) |

(Continued)

(52) U.S. Cl.
CPC ......... *H04W 12/08* (2013.01); *H04L 41/0806* (2013.01); *H04L 41/0886* (2013.01); *H04W 4/70* (2018.02); *H04W 8/22* (2013.01); *H04W 8/245* (2013.01); *H04W 12/04* (2013.01); *H04W 12/06* (2013.01); *H04W 12/35* (2021.01); *H04W 12/50* (2021.01); *H04W 8/265* (2013.01); *H04W 80/04* (2013.01); *H04W 88/04* (2013.01)

(58) Field of Classification Search
CPC ....... H04W 12/08; H04W 4/70; H04W 80/04; H04L 41/0886; H04L 67/02; H04L 8/22; H04L 12/04; H04L 12/06
USPC ....................... 455/411, 550.1, 436
See application file for complete search history.

(56) References Cited

U.S. PATENT DOCUMENTS

| | | |
|---|---|---|
| 8,484,712 B2 | 7/2013 | Ganem |
| 8,857,705 B2 | 10/2014 | Larson et al. |

(Continued)

*Primary Examiner* — Danh C Le
(74) *Attorney, Agent, or Firm* — Robert C. Kowert; Kowert, Hood, Munyon, Rankin & Goetzel, P.C.

(57) ABSTRACT

A provisioning device may be shipped to a client and used to automatically provision an IoT device to join a local network to communicate with a remote service provider. In response to a trigger input, the provisioning device creates a wireless hotspot that is recognizable by an IoT device as a provisioning hotspot. The provisioning device receives a signal from the IoT device indicating that the IoT device is available to be provisioned. The provisioning device obtains provisioning data and transmits the provisioning data to the IoT device. The IoT device uses the provisioning data to connect to a local wireless network and to establish a connection to the remote service provider. The IoT device may then use one or more IoT services of the service provider.

20 Claims, 15 Drawing Sheets

Related U.S. Application Data continuation of application No. 15/362,493, filed on Nov. 28, 2016, now Pat. No. 9,913,143.

(51) Int. Cl.
*H04W 12/50* (2021.01)
*H04W 12/04* (2021.01)
*H04W 8/26* (2009.01)
*H04W 88/04* (2009.01)
*H04W 80/04* (2009.01)

(56) References Cited

U.S. PATENT DOCUMENTS

| | | | |
|---|---|---|---|
| 9,288,671 | B2 | 3/2016 | Coghlan et al. |
| 9,326,304 | B2 | 4/2016 | Pelland et al. |
| 9,395,599 | B2 | 7/2016 | Oishii et al. |
| 9,654,532 | B2 | 5/2017 | Strigeus et al. |
| 9,913,143 | B1 | 3/2018 | Roche et al. |
| 10,502,572 | B1* | 12/2019 | Surmi ............... G01C 21/00 |
| 10,779,162 | B1* | 9/2020 | Wei ................. H04W 88/04 |
| 2006/0046693 | A1* | 3/2006 | Tran ............... H04L 63/0853 455/411 |
| 2009/0085744 | A1* | 4/2009 | Sellin ............... H04W 12/08 340/572.1 |
| 2009/0319640 | A1 | 12/2009 | Kugel |
| 2010/0071038 | A1* | 3/2010 | Flynn ............... H04L 67/28 726/5 |
| 2010/0125668 | A1 | 5/2010 | Bocchieri et al. |
| 2010/0195621 | A1 | 8/2010 | Kekki et al. |
| 2010/0272013 | A1 | 10/2010 | Horn et al. |
| 2011/0067091 | A1* | 3/2011 | Chavez ............ H04L 63/0823 726/5 |
| 2011/0131241 | A1 | 6/2011 | Petrou et al. |
| 2011/0176524 | A1* | 7/2011 | Fasbender ........ H04L 67/32 370/338 |
| 2012/0036233 | A1 | 2/2012 | Scahill et al. |
| 2012/0086563 | A1* | 4/2012 | Arling ............... G08C 17/00 340/12.52 |
| 2012/0269162 | A1 | 10/2012 | Vesterinen et al. |
| 2012/0317252 | A1 | 12/2012 | Vemulapalli et al. |
| 2013/0094444 | A1 | 4/2013 | Lai et al. |
| 2013/0210388 | A1* | 8/2013 | Li .................... H04W 12/1205 455/411 |
| 2014/0351880 | A1* | 11/2014 | Low .................. H04L 63/20 726/1 |
| 2015/0081837 | A1* | 3/2015 | Bernier ............. H04W 4/50 709/217 |
| 2015/0088890 | A1 | 3/2015 | Hoffert et al. |
| 2015/0089075 | A1* | 3/2015 | Strigeus ............ G06F 16/2228 709/231 |
| 2015/0095819 | A1* | 4/2015 | Hong ................ G06F 3/04886 715/765 |
| 2015/0106887 | A1* | 4/2015 | Aslund ............. H04L 63/0492 726/5 |
| 2015/0237169 | A1 | 8/2015 | Chen et al. |
| 2015/0278678 | A1* | 10/2015 | Sharma ............ H04W 4/20 706/11 |
| 2015/0382288 | A1* | 12/2015 | Wang ................ H04W 48/16 455/434 |
| 2016/0021117 | A1 | 1/2016 | Harmon et al. |
| 2016/0066127 | A1* | 3/2016 | Choi ................. H04W 12/003 455/41.2 |
| 2016/0072809 | A1* | 3/2016 | Rezvani ........... G06F 21/31 726/5 |
| 2016/0127549 | A1* | 5/2016 | Sharma ............ H04L 45/22 379/112.09 |
| 2016/0255238 | A1* | 9/2016 | Saito ................. H04N 1/00307 358/1.13 |
| 2016/0335693 | A1* | 11/2016 | Lin ................... G06F 16/90324 |
| 2016/0364114 | A1 | 12/2016 | Von Dehsen et al. |
| 2017/0046944 | A1* | 2/2017 | Namazi ............ G08B 27/00 |
| 2017/0061419 | A1 | 3/2017 | Kim et al. |
| 2017/0078922 | A1* | 3/2017 | Raleigh ............ H04W 28/10 |
| 2017/0085638 | A1* | 3/2017 | Lee .................. H04L 67/1051 |
| 2017/0171182 | A1* | 6/2017 | Yanacek ........... H04L 63/0876 |
| 2017/0331898 | A1* | 11/2017 | Lee .................. H04L 67/02 |
| 2018/0070204 | A1* | 3/2018 | Annamalai ....... H04W 8/04 |
| 2018/0109395 | A1* | 4/2018 | Berdy ............... H04W 4/50 |
| 2018/0300051 | A1* | 10/2018 | Kim ................. G06F 3/0416 |
| 2018/0376325 | A1* | 12/2018 | Xu ................... H04W 8/245 |
| 2019/0013968 | A1* | 1/2019 | Xie .................. H04L 12/4641 |
| 2019/0029068 | A1* | 1/2019 | Sturek .............. H04L 61/20 |
| 2020/0092019 | A1* | 3/2020 | Wang ............... H04W 24/02 |

* cited by examiner

AUTO-PROVISIONING DEVICE

This application is a continuation of U.S. patent application Ser. No. 15/912,226, filed Mar. 5, 2018, which is a continuation of U.S. patent application Ser. No. 15/362,493, filed Nov. 28, 2016, now U.S. Pat. No. 9,913,143, which are hereby incorporated by reference herein in their entirety.

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, etc. Many client devices make use of a long-lived connection with a server of a remote service provider in order to stream data from the client device to the server and from the server to the client device whenever data needs to be transmitted (e.g., publish-subscribe communication).

The process of provisioning an IoT device to connect to a service provider and to use services of the service provider can be a high-friction process. For example, configuring a local wireless connection, device authentication, and binding to a user account at the service provider can be a time-consuming and complex exercise. A user may be required to enter a large amount of data at multiple steps in order to provision an IoT device to establish a connection with a service provider and to begin using the IoT device. Therefore, the process can be error-prone, which often results in requiring a user to repeat the same step multiple times before successfully provisioning a given IoT device.

Figure 1:
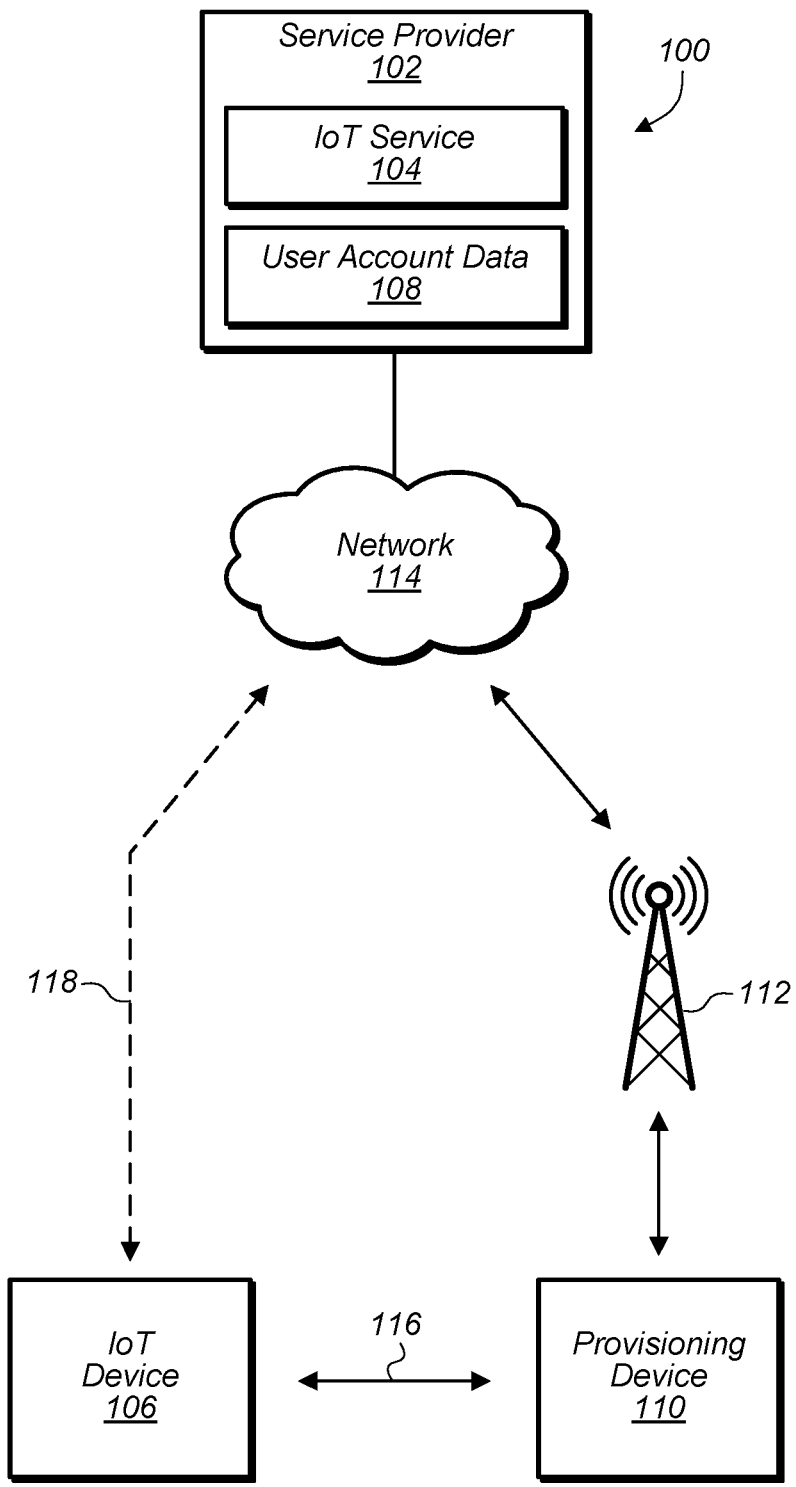
FIG. 1 illustrates a system for provisioning an IoT device to connect to a service provider, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement provisioning of an internet-connectable device (e.g., an IoT device) using a separate provisioning device, in order to provide an auto-provisioning technique to set up the internet-connectable device for connecting to a remote service provider (e.g., by joining a local network to communicate with a remote service provider via the internet). Using an auto-provisioning technique via a separate provisioning device may be a faster and less error-prone way of setting up a device, compared to other methods, which may require multiple time-consuming steps and multiple user inputs.

As used herein, an IoT device may be any type of internet-connectable device capable of sending data to and/or receiving data from a service provider in order to use one or more services of the service provider. Thus, in embodiments, an IoT device may process and modify at least some of the data before the data is sent to a service provider and/or the IoT device may process and modify at least some of the data after receiving the data from a service provider.

In some embodiments, in response to receiving a trigger input (e.g., a physical action or a voice command), a provisioning device may provide an indication (e.g., a wireless hotspot signal) that the provisioning device is available to provision an IoT device to join a local network to communicate with a remote service provider via the internet. The provisioning device may receive an indication (e.g., a wireless signal) from an IoT device indicating that the IoT device is available to be provisioned to join the local network to communicate with the service provider. The provisioning device may obtain provisioning data usable to provision the IoT device to join the local network to communicate with the service provider and transmit at least some of the provisioning data to the IoT device to provision the IoT device to join the local network to communicate with the service provider (e.g., in order to establish a connection/connect with the service provider).

As the number of IoT devices increases and as they become more complex, the above benefits may increase in importance. Various embodiments provide for a reduced time and cost for setting up IoT devices, as the use of a provisioning device may eliminate manual steps that each require user input to provision an IoT device to connect to a local network and/or a remote service provider. Embodiments may reduce or eliminate input errors that may occur during manual steps. Thus, the amount of time and/or computing resources used to set up an IoT device may be reduced. In some embodiments, bandwidth usage of a local network may be reduced or avoided, as the provisioning data for an IoT device may be downloaded via a separate connection that does not use local network bandwidth.

FIG. 1 illustrates a system for provisioning an IoT device to connect to a service provider, according to some embodiments. The devices depicted in FIG. 1 may be the same types of devices, and include some or all of the same components as other devices depicted in FIGS. 1-9, in embodiments.

In the depicted embodiment, a remote service provider 102 provides an IoT service 104 that may be used by IoT devices of one or more different clients, such as IoT device 106. In embodiments, the service provider stores user account data 108 that includes information for the IoT device 106 and/or information associated with a client that uses the IoT device 106 and/or the IoT service 104. For example, user account data 108 may include provisioning data to provision the IoT device 106, as described below.

A provisioning device 110 may be used to provision the IoT device 106 to join a local network to communicate with the service provider 102 via the internet. In the example embodiment, the provisioning device 110 connects to a service provider 102 via cellular network 112 and network 114 (e.g., a wide-area network, such as the internet) to obtain provisioning data from the service provider 108 that is usable to provision the IoT device 110 to connect to the service provider 102. In some embodiments, the provisioning device 110 may connect to the service provider 102 via paths other than the cellular network 112 and/or the network 114. For example, the provisioning device 110 may connect to the network 114 via a local network (e.g., local wireless network). Any other suitable technique or combination of techniques for establishing a connection to the service provider to download provisioning data may be performed (e.g., satellite and/or cellular network 112 and/or network 114). Further, in some embodiments, the provisioning data may be pre-loaded onto the provisioning device 110 before it is sent to the client (e.g., at a location of the service provider 102).

In embodiments, the provisioning device 110 may transmit at least some of the provisioning data to the IoT device 106 using a wireless connection 116 between the provisioning device 110 and the IoT device 106. For example, the provisioning device 110 may send the provisioning data via a wireless network interface (e.g., wireless antenna) of the provisioning device 110 and the IoT device 106 may receive the provisioning data via a wireless network interface of the IoT device 106. In some embodiments, non-wireless network interfaces are instead used at each device to transmit data between the devices. For example, a suitable communication cable may be connected at each end to a corresponding network interface of the IoT device 106 and the provisioning device 110.

After the IoT device 106 receives the provisioning data, the IoT device 106 may establish a connection 118 with the service provider 102 based on the received provisioning data. In some embodiments, the IoT device 106 provides at least some of the provisioning data to the service provider 102 in order to establish the connection 118. For example, the IoT device 106 may provide login/user credentials and/or user account information usable to associate the IoT device 106 to a particular user account at the service provider 102. In some embodiments, the provisioning data includes wireless network information usable to connect the IoT device 106 to a local wireless network (e.g., to a router or other intermediate device). Thus, the connection 118 between the IoT device 106 and the service provider 102 may be established using any number of devices, such as any number of devices within a local wireless network and/or any number of devices within the network 114.

Figure 2A:
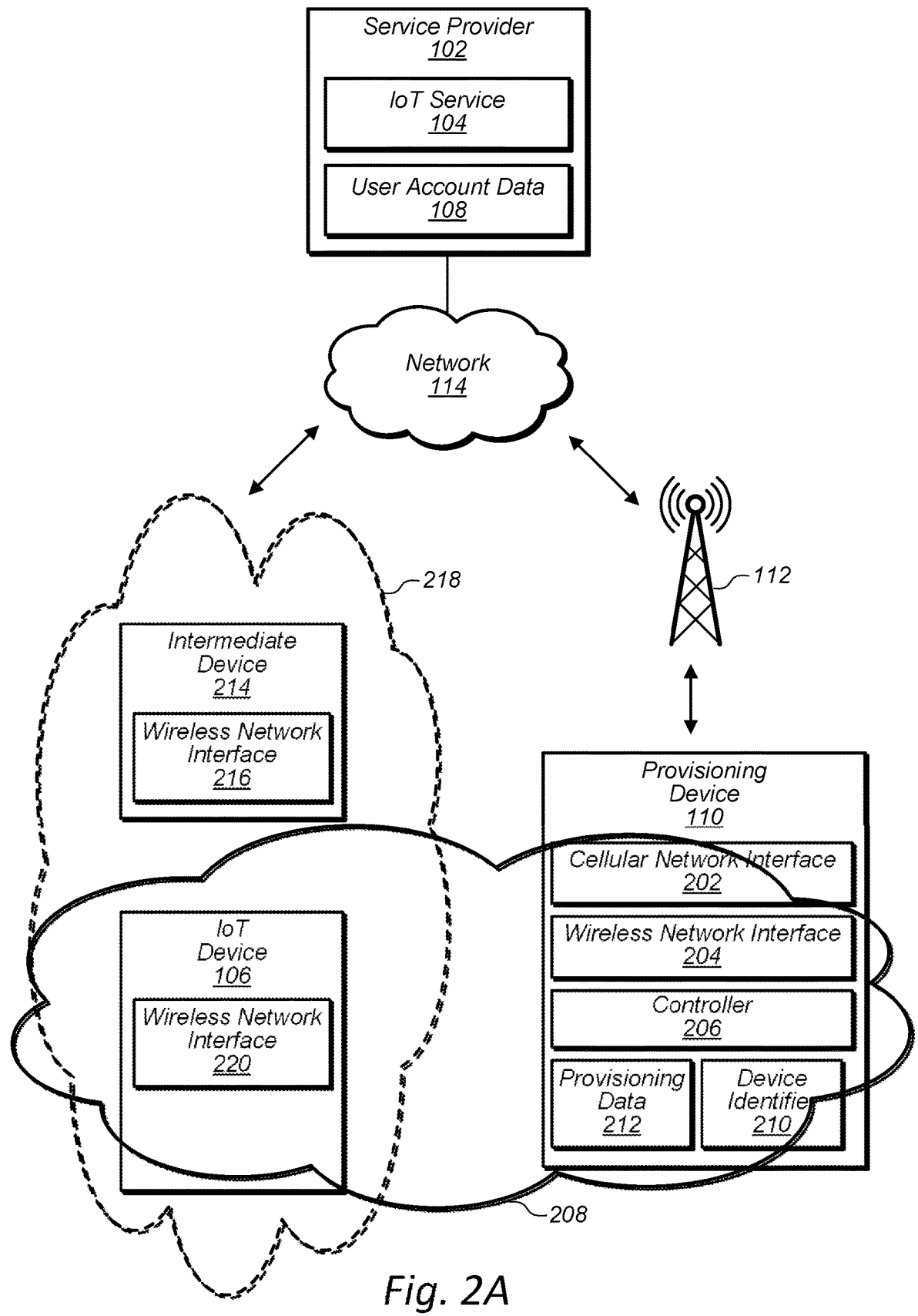
FIG. 2A illustrates a system and a process for provisioning an IoT device using a provisioning device, including downloading of provisioning data, according to some embodiments.

FIG. 2A illustrates a system and a process for provisioning an IoT device using a provisioning device, including downloading of provisioning data, according to some embodiments. In the depicted embodiment, a service provider 102 provides an IoT service 104 that may be used by one or more IoT devices. In embodiments, the service provider 102 stores user account data 108 that includes information for the IoT device 106 and/or information associated with a client that has obtained or purchased the IoT device 106 and/or the IoT service 104.

The provisioning device 110 includes a cellular network interface 202, a wireless network interface 204, and a controller 206. The cellular network interface 202 may be hardware (e.g., antenna) and/or software for communicating with a cellular network 112 to establish a connection with the service provider 102. A wireless network interface, such as the wireless network interface 204, may be hardware (e.g., antenna) and/or software for communicating with another device (e.g., IoT device 106) to establish a wireless connection with the other device. For example, the provisioning device 110 may generate a provisioning signal (e.g., a provisioning hotspot signal) that the IoT device 106 may recognize in order to join or become a member of the provisioning network 208 that includes at least the provisioning device 110 and the IoT device 106.

In embodiments, the provisioning device 110 connects to the service provider 102 via the cellular network interface 202, the wireless network interface 204, and/or any other network interface. The provisioning device 110 may then provide user credentials to the service provider, which are associated with user account data at the service provider (e.g., provisioning data 212 and/or other data associated with the user or devices of the user). In embodiments, the user credentials may include security/login information for the user. Subsequent to providing the user credentials to the service provider, the provisioning device 110 may download at least a portion of the provisioning data 212 from the service provider.

The controller 206 may be hardware and/or software (e.g., a processor and/or memory) that causes the provisioning device 110 to perform any of the actions and/or make any of the determinations described with respect to the provisioning device 110. For example, in response to a particular determination, the controller 206 may cause the provisioning device 110 to send and/or receive provisioning data 212 or the device identifier 210. Similarly, the IoT device 106 may also have a controller that performs any of the actions and/or makes any of the determinations described with respect to the IoT device 106.

In embodiments, the provisioning data 212 may include local network credentials and a network address for the service provider 102 usable to provision the IoT device 106 to join a local network to communicate with the service provider 102. In embodiments, the local network credentials are wireless network credentials for a local wireless network. In some embodiments, the provisioning data 212 includes user credentials that are associated with user account data at the service provider 102, which are transmitted to the service provider 102 to communicate and/or connect with the service provider 102. In some instances, the provisioning data 212 includes user account information usable to associate the IoT device 106 to a particular user account at the service provider 102. Subsequent to transmitting the user account information to the service provider 102, the IoT device 106 may receive one or more commands from a particular service of the service provider 102.

The provisioning device 110 may also include a device identifier 210 that identifies the provisioning device 110, and which may be stored in any type of suitable long-term storage device (e.g., non-volatile memory) that does not require power to retain data. In embodiments, the device identifier 210 is a unique identifier, at least with respect to other device identifiers for other devices that may be stored in user account data 108, so that the provisioning device 110 may be uniquely identified and associated with the client that is using the provisioning device 110 to provision the IoT device 106.

In an embodiment, the provisioning device 110 connects to a service provider 102 via cellular network 112 and network 114 to obtain (e.g., download) provisioning data 212 from the service provider 108 that is usable to provision the IoT device 106 to connect to the service provider 102. The provisioning device 110 may provide, via the wireless network interface 202, an indication that the provisioning device 110 is available to provision an IoT device (e.g., IoT device 106) to connect to a remote service provider (e.g., service provider 102). As discussed above, the provisioning device 110 may do so by generating a provisioning signal (e.g. a provisioning hotspot signal) that the IoT device 106 may recognize in order to join the provisioning network 208.

In some embodiments, subsequent to communicating with the service provider 102, the IoT device provides an indication to the provisioning device 110 that provisioning of the IoT device 106 was successful. In some instances, subsequent to communicating with the service provider 102, the IoT device 106 provides no longer attempts to communicate with the provisioning device 110. In embodiments, in response to determining that the IoT device 106 is unable to communicate with the service provider 106, the IoT device 106 searches for an indication that the provisioning device 110 or another provisioning device is available to provision the IoT device 106. This may occur if the login credentials of the local network are changed or if the IoT device 106 is moved to another location (e.g., with a different local network) that prevents the IoT device 106 form continuing to use the local network.

In the example embodiment, an intermediate device 214 that is connected to the network 114 (e.g., a router connected to the internet) includes a wireless network interface 216. The wireless network interface 216 may be used to generate a local wireless network signal that a device may recognize in order to join a local wireless network 218. However, the IoT device 106 may be unable to join the local wireless network 218, even though it includes a wireless network interface 220, because the IoT device 106 has not been provisioned with the data necessary to join (e.g., local wifi credentials). Therefore, the local wireless network 218 is represented with a dashed line.

Figure 2B:
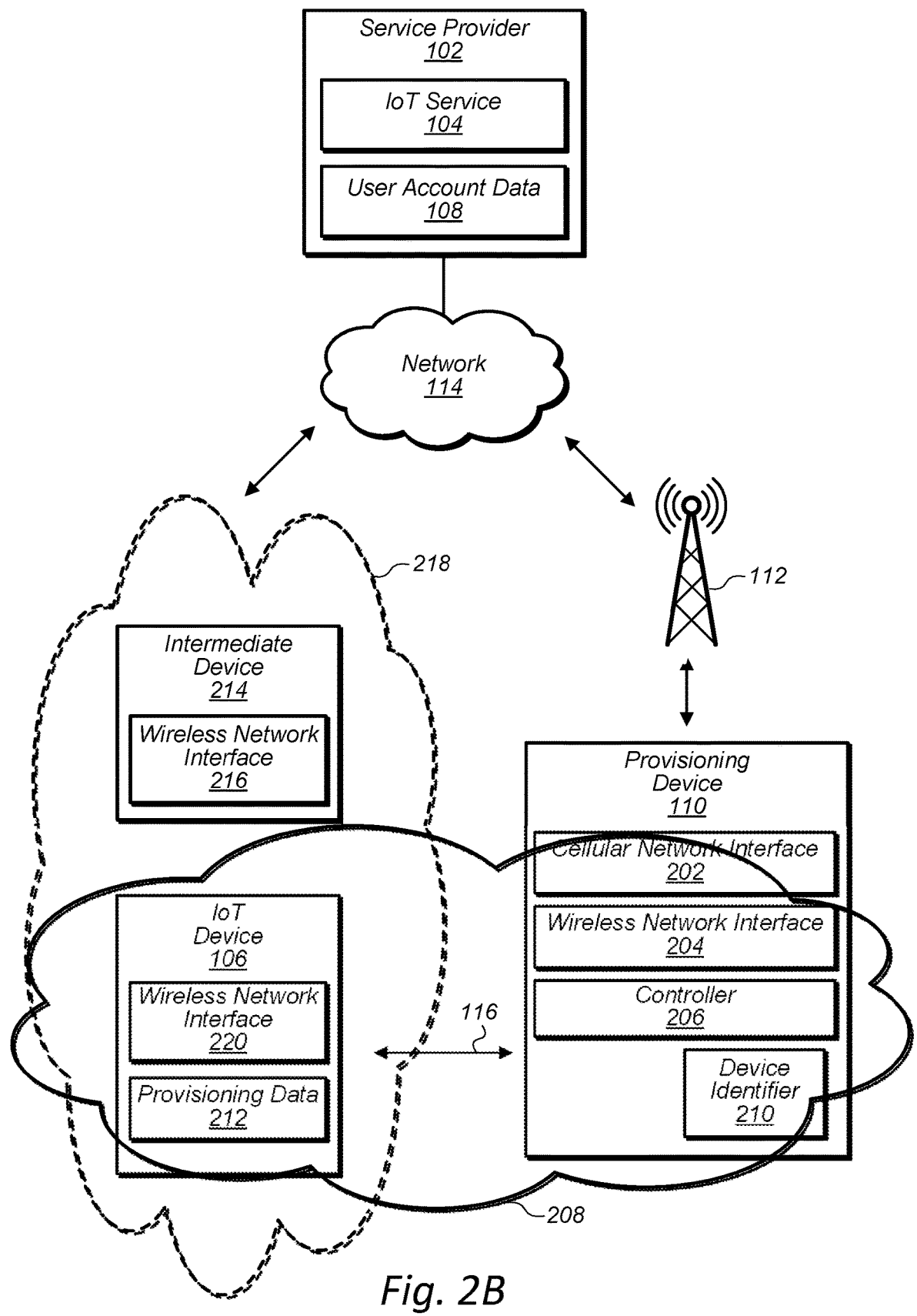
FIG. 2B illustrates a system and a process for provisioning an IoT device using a provisioning device, including transmitting provisioning data to the IoT device, according to some embodiments.

FIG. 2B illustrates a system and a process for provisioning an IoT device using a provisioning device, including transmitting provisioning data to the IoT device, according to some embodiments. In the depicted embodiment, the provisioning device 110 may provide, via the wireless network interface 202, an indication that the provisioning device 110 is available to provision the IoT device 106 to connect to the remote service provider 102. In embodiments, the provisioning device 110 may provide the indication by generating a provisioning signal (e.g. a provisioning hotspot signal) that the IoT device 106 may recognize in order to join the provisioning network 208.

Thus, in embodiments, the IoT device 106 may use its wireless network interface 220 to search for a provisioning signal and to identify, detect, and/or discover the provisioning signal. In embodiments, the IoT device 106 is preprogrammed to search for and to recognize the provisioning signal as a signal unique to devices that are for provisioning the IoT device 106 to connect to a service provider, such as the service provider 102. Thus, the IoT device 106 may be pre-programmed to "hit" a wireless hotspot generated by the provisioning device 110. In some embodiments, in response to detecting and/or discovering the provisioning signal, the IoT device 106 generates, via the wireless network interface 220, an indication (e.g. a wireless signal) indicating that the IoT device 106 is available to be provisioned to connect to the service provider 102. In some embodiments, the provisioning device 110 may use the wireless network interface 220 to provide the wireless hotspot and communicate with the IoT device 106 while simultaneously using the cellular network interface 202 to communicate with the service provider 102.

In an embodiment, in response to the IoT device 106 identifying and/or detecting the wireless hotspot of the provisioning device 110, the provisioning device 110 and the IoT device 106 may establish a wireless connection 116 to allow transmission of provisioning data 212 to the IoT device 106 over the wireless connection 116. In embodiments, the provisioning device 110 receives, via the wireless network interface 204, an indication (e.g., a wireless signal) that the IoT device 106 is available to be provisioned to connect to the service provider 102 and in response, transmits the provisioning data 212 to the IoT device 106.

Figure 2C:
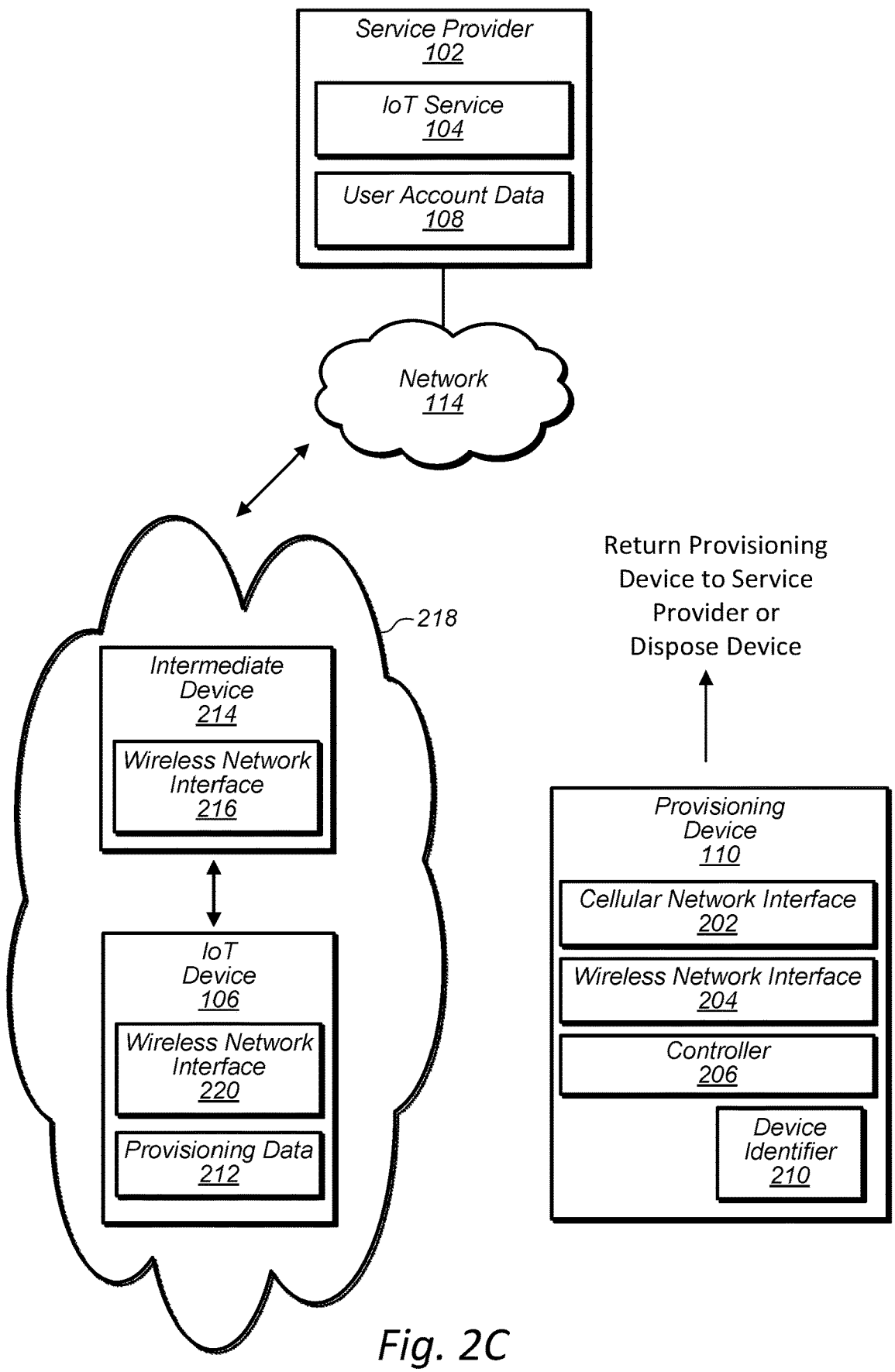
FIG. 2C illustrates a system and a process for provisioning an IoT device using a provisioning device, including connecting the IoT device to a service provider, according to some embodiments.

FIG. 2C illustrates a system and a process for provisioning an IoT device using a provisioning device, including connecting the IoT device to a service provider, according to some embodiments. In the example embodiment, in order to establish a connection with the service provider 102, the IoT device must first establish a connection with the intermediate device 214. In the depicted embodiment, the IoT device 106 provides to the intermediate device 214 at least a portion of the provisioning data 212 (e.g., local wifi credentials)

necessary to join the local wireless network 218 and/or establish a connection with the intermediate device 214.

In the example embodiment, the IoT device 106 may transmit at least the portion of the provisioning data 212 via the wireless network interface 220 and the intermediate device 214 may receive at least the portion of the provisioning data 212 via the wireless network interface 216. In response to authenticating the IoT device based on the received provisioning data, the intermediate device 214 may add the IoT device 106 to the local wireless network 218 and/or establish a connection with the IoT device 106. Thus, the local wireless network 218 is represented with a solid line, to show that the IoT device 106 has joined the local wireless network 218.

Subsequent to joining the local wireless network 218 and/or establishing a connection with the intermediate device 214, the IoT device may establish a connection 118 with the service provider 102, based at least on the provisioning data 212. For example, the IoT device 106 may send to the service provider 102 user account information usable to associate the IoT device 106 to a particular user account stored in the user account data 108 at the service provider 102. The user account information may include any information suitable for establishing the connection 118 with the service provider 102 and/or associating the IoT device 106 to a particular user account stored in the user account data 108, such as a user or client identifier, a device identifier of the IoT device 106, and/or the device identifier 210 of the provisioning device 110.

In an embodiment, in response to authenticating the IoT device 106 based at least on the user account information provided by the IoT device 106, the service provider may begin providing one or more IoT services 104 for the IoT device 106. Authenticating the IoT device 106 may include determining, by the service provider 102, that at least some of the user account information received from the IoT device 106 matches at least some of the information of a particular account stored in the user account data 108 (e.g., device identifier for IoT device 106, device identifier for provisioning device 110, and/or security credentials that correspond to a user account in the user account data 108).

In some embodiments, the connection 116 between the IoT device 106 and the provisioning device 110 is terminated in response to determining, by the IoT device 106 and/or the provisioning device 110, that the provisioning of the IoT device 106 was successful and/or establishing the connection 118 to the service provider 102 was successful. In some embodiments, the IoT device 106 terminates the connection 116 to the provisioning device 110 in response to receiving the provisioning data 212, in order to establish a connection to the intermediate device 214 via the wireless network interface 220.

In some instances, after the IoT device 106 is provisioned and/or the connection 118 to the service provider 102 is established, the provisioning device 110 is shipped back to the service provider 102 so it can be recycled for use by another client or the same client. In other cases, after the IoT device 106 is provisioned and/or the connection 118 to the service provider 102 is established, the provisioning device 110 is disposed of and not used again.

Figure 3A:
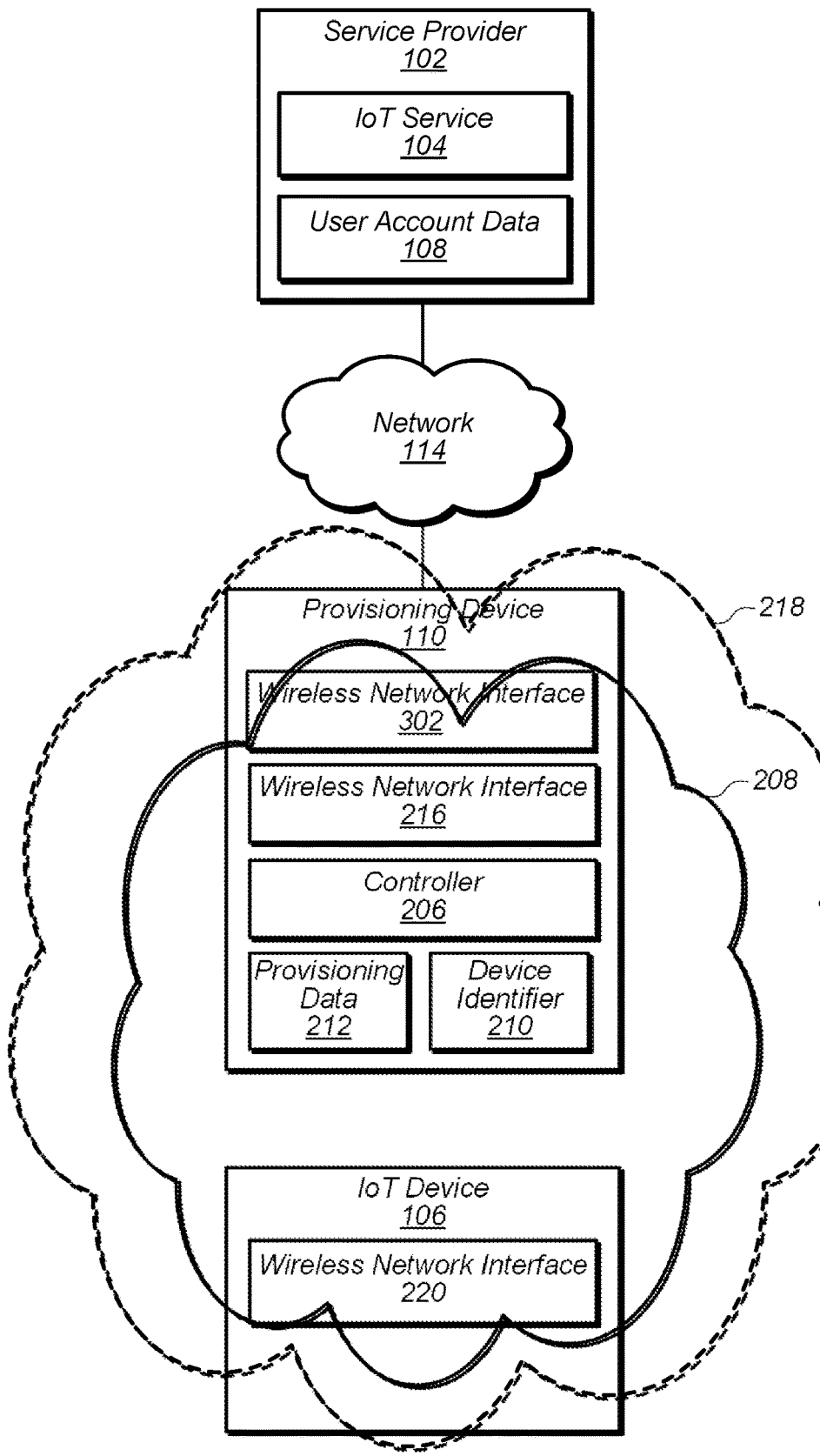
FIG. 3A illustrates a system and a process for provisioning an IoT device using an intermediate device of a local wireless network, including downloading of provisioning data, according to some embodiments.

FIG. 3A illustrates a system and a process for provisioning an IoT device using an intermediate device of a local wireless network, including downloading of provisioning data, according to some embodiments. One or more aspects of the example embodiment of FIGS. 3A-3C may be the same or similar to those described above, such as for FIGS. 2A-2C. In the depicted embodiment, a service provider 102 provides an IoT service 104 that may be used by one or more IoT devices. In embodiments, the service provider 102 stores user account data 108 that includes information for the IoT device 106 and/or information associated with a client that has obtained or purchased the IoT device 106 and/or the IoT service 104.

In the depicted embodiment, a provisioning device 110 is a member of a local wireless network 218 and can be configured to be an intermediate device for a connection 118 between the IoT device 106 and the service provider 102. For example, the provisioning device may be a router or other device that maintains a continuous connection to the network 114 in order to provide internet access to members of the local wireless network 218. The provisioning device 110 may include a wireless network interface 302, a wireless network interface 216, a controller 206, and a device identifier 210. The wireless network interface 302 and the wireless network interface 216 may each be hardware (e.g., antenna) and/or software for communicating with another device (e.g., IoT device 106) to establish a wireless connection with the other device. As describe above, the controller 206 may be hardware and/or software (e.g., a processor and/or memory) that causes the provisioning device 110 to perform any of the actions and/or make any of the determinations described with respect to the provisioning device 110.

In an embodiment, the provisioning device 110 connects to a service provider 102 via network 114 to obtain (e.g., download) provisioning data 212 from the service provider 108 that is usable to provision the IoT device 106 to connect to the service provider 102. The provisioning device 110 may provide, via the wireless network interface 302, an indication that the provisioning device 110 is available to provision an IoT device (e.g., IoT device 106) to connect to a remote service provider (e.g., service provider 102). As discussed above, the provisioning device 110 may do so by generating a provisioning signal (e.g. a provisioning hotspot signal) that the IoT device 106 may recognize in order to join the provisioning network 208.

Figure 3B:
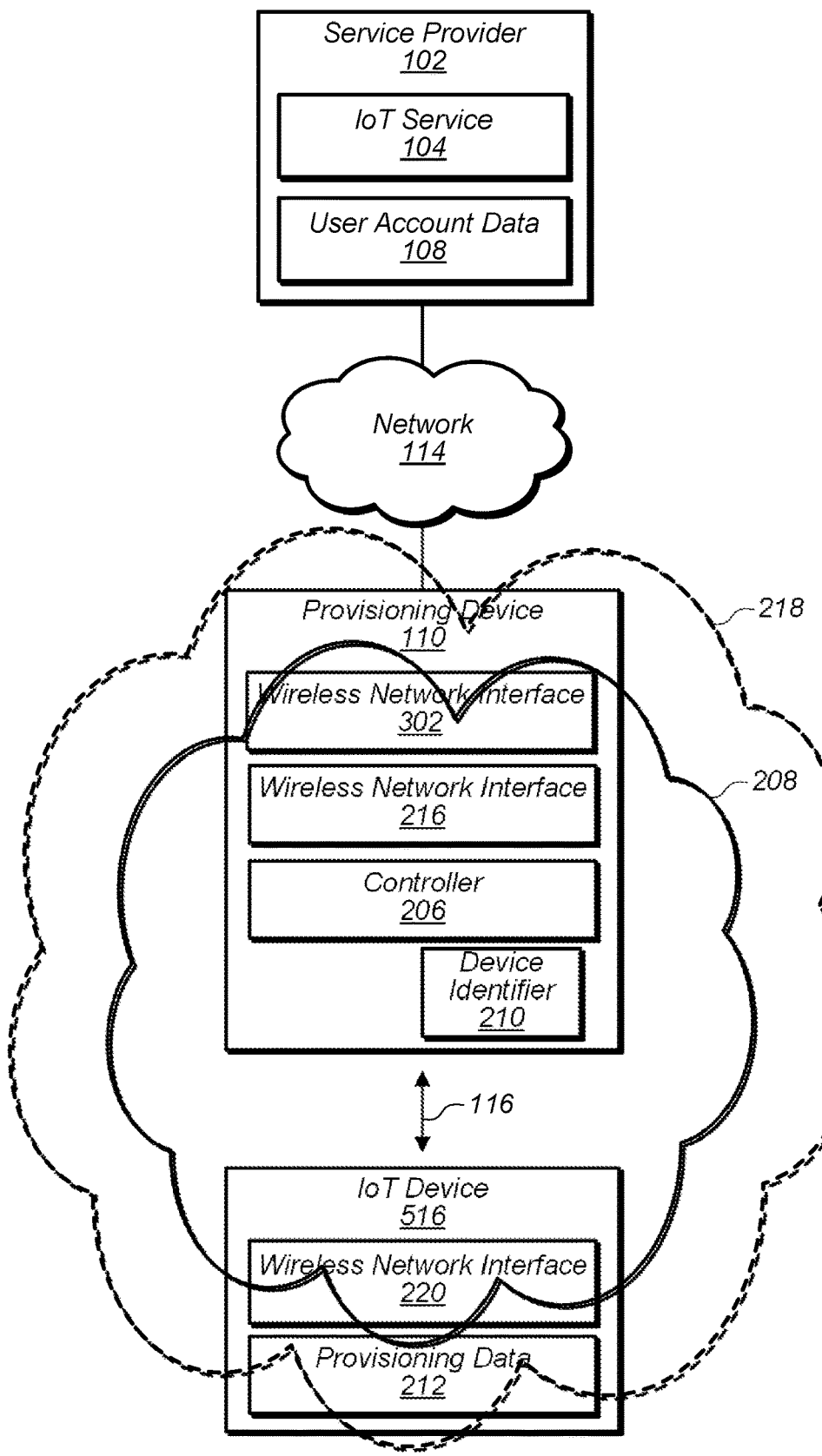
FIG. 3B illustrates a system and a process for provisioning an IoT device using an intermediate device of a local wireless network, including transmitting provisioning data to the IoT device, according to some embodiments.

FIG. 3B illustrates a system and a process for provisioning an IoT device using an intermediate device of a local wireless network, including transmitting provisioning data to the IoT device, according to some embodiments. In the depicted embodiment, the provisioning device 110 may provide, via the wireless network interface 302, an indication that the provisioning device 110 is available to provision the IoT device 106 to connect to the remote service provider 102. In embodiments, the provisioning device 110 may provide the indication by generating a provisioning signal (e.g. a provisioning hotspot signal) that the IoT device 106 may recognize in order to join the provisioning network 208.

Thus, in embodiments, the IoT device 106 may use its wireless network interface 220 to search for a provisioning signal and to identify, detect, and/or discover the provisioning signal. In embodiments, the IoT device 106 is preprogrammed to search for and to recognize the provisioning signal as a signal unique to devices that are for provisioning the IoT device 106 to connect to a service provider, such as the service provider 102. Thus, the IoT device 106 may be pre-programmed to "hit" a wireless hotspot generated by the provisioning device 110. In some embodiments, in response to detecting and/or discovering the provisioning signal, the IoT device 106 generates, via the wireless network interface 220, an indication (e.g. a wireless signal) indicating that the IoT device 106 is available to be provisioned to connect to the service provider 102.

In an embodiment, in response to the IoT device 106 identifying and/or detecting the wireless hotspot of the provisioning device 110, the provisioning device 110 and the IoT device 106 may establish a wireless connection 116 to allow transmission of provisioning data 212 to the IoT device 106 over the wireless connection 116. The provisioning device 110 receives, via the wireless network interface 204, an indication (e.g., a wireless signal) that the IoT device 106 is available to be provisioned to connect to the service provider 102 and in response, transmits the provisioning data 212 to the IoT device 106.

Figure 3C:
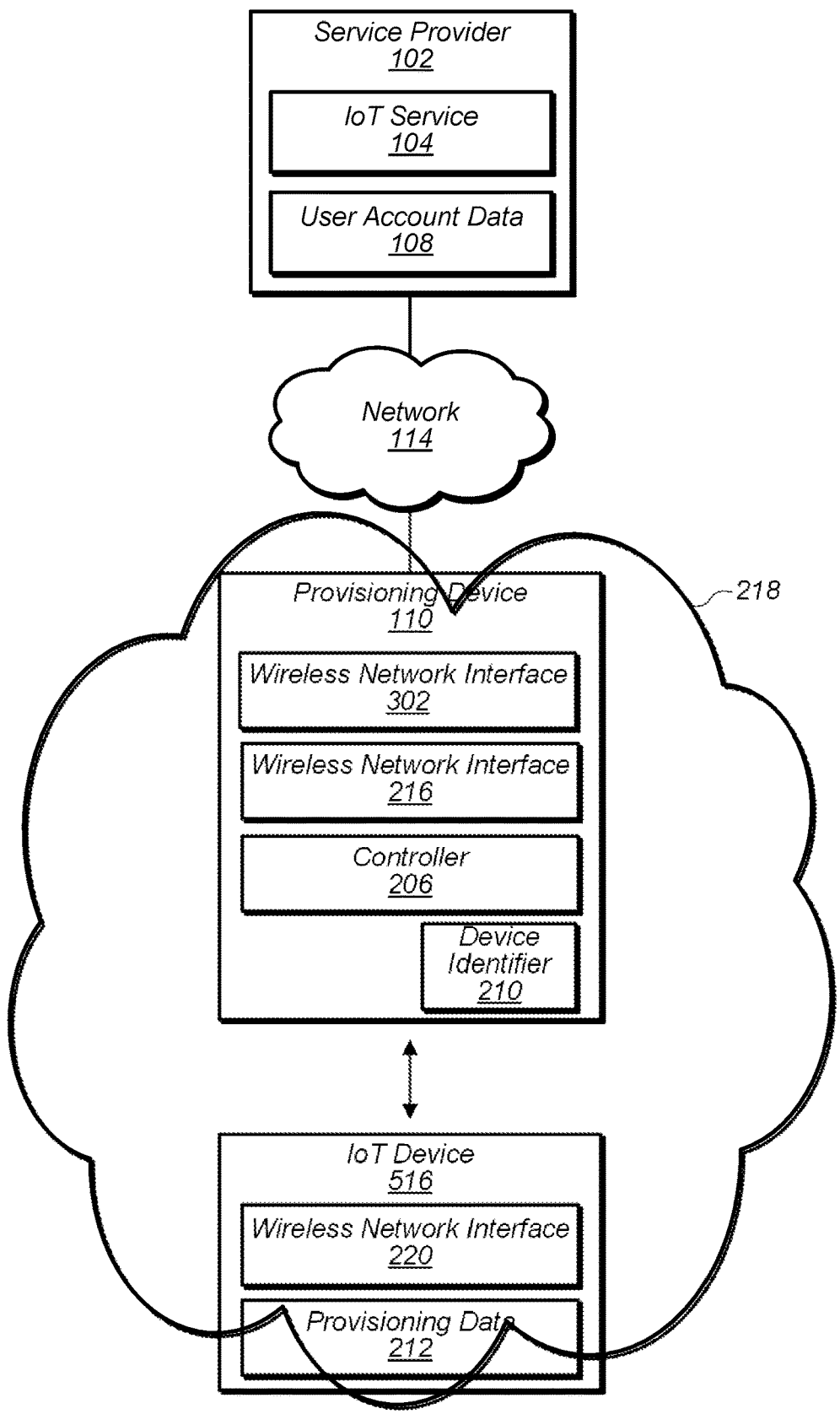
FIG. 3C illustrates a system and a process for provisioning an IoT device using an intermediate device of a local wireless network, including connecting the IoT device to a service provider, according to some embodiments.

FIG. 3C illustrates a system and a process for provisioning an IoT device using an intermediate device of a local wireless network, including connecting the IoT device to a service provider, according to some embodiments. In the example embodiment, in order to establish a connection with the service provider 102, the IoT device must first join the local wireless network 218 by establishing a connection with the other wireless network interface 216 of the provisioning device 110. In the depicted embodiment, the IoT device 106 provides to the provisioning device 110 at least a portion of the provisioning data 212 (e.g., local wifi credentials) necessary to join the local wireless network 218 and/or establish a connection via the other wireless network interface 216 the intermediate device 214.

In the example embodiment, the IoT device 106 may transmit at least the portion of the provisioning data 212 via the wireless network interface 220 and the provisioning device 110 may receive at least the portion of the provisioning data 212 via the wireless network interface 216. In response to authenticating the IoT device 106 based on the received provisioning data, the provisioning device 110 may add the IoT device 106 to the local wireless network 218. Thus, the local wireless network 218 is represented with a solid line, to show that the IoT device 106 has joined the local wireless network 218.

In some embodiments, the IoT device 106 disconnects from the provisioning network 208 in response to receiving the provisioning data 212, in order to join the local wireless network 218 by establishing a connection to the provisioning device 110 via the other wireless network interface 216. Subsequent to joining the local wireless network 218, the IoT device may establish a connection 118 with the service provider 102, based at least on the provisioning data 212. As discussed above, the IoT device 106 may send to the service provider 102 user account information usable to associate the IoT device 106 to a particular user account stored in the user account data 108 at the service provider 102.

In an embodiment, in response to authenticating the IoT device 106 based at least on the user account information provided by the IoT device 106, the service provider may begin providing one or more IoT services 104 for the IoT device 106. As above, authenticating the IoT device 106 may include determining, by the service provider 102, that at least some of the user account information received from the IoT device 106 matches at least some of the information of a particular account stored in the user account data 108 (e.g., device identifier for IoT device 106, device identifier for provisioning device 110, and/or security credentials for a user account).

Figure 4A:
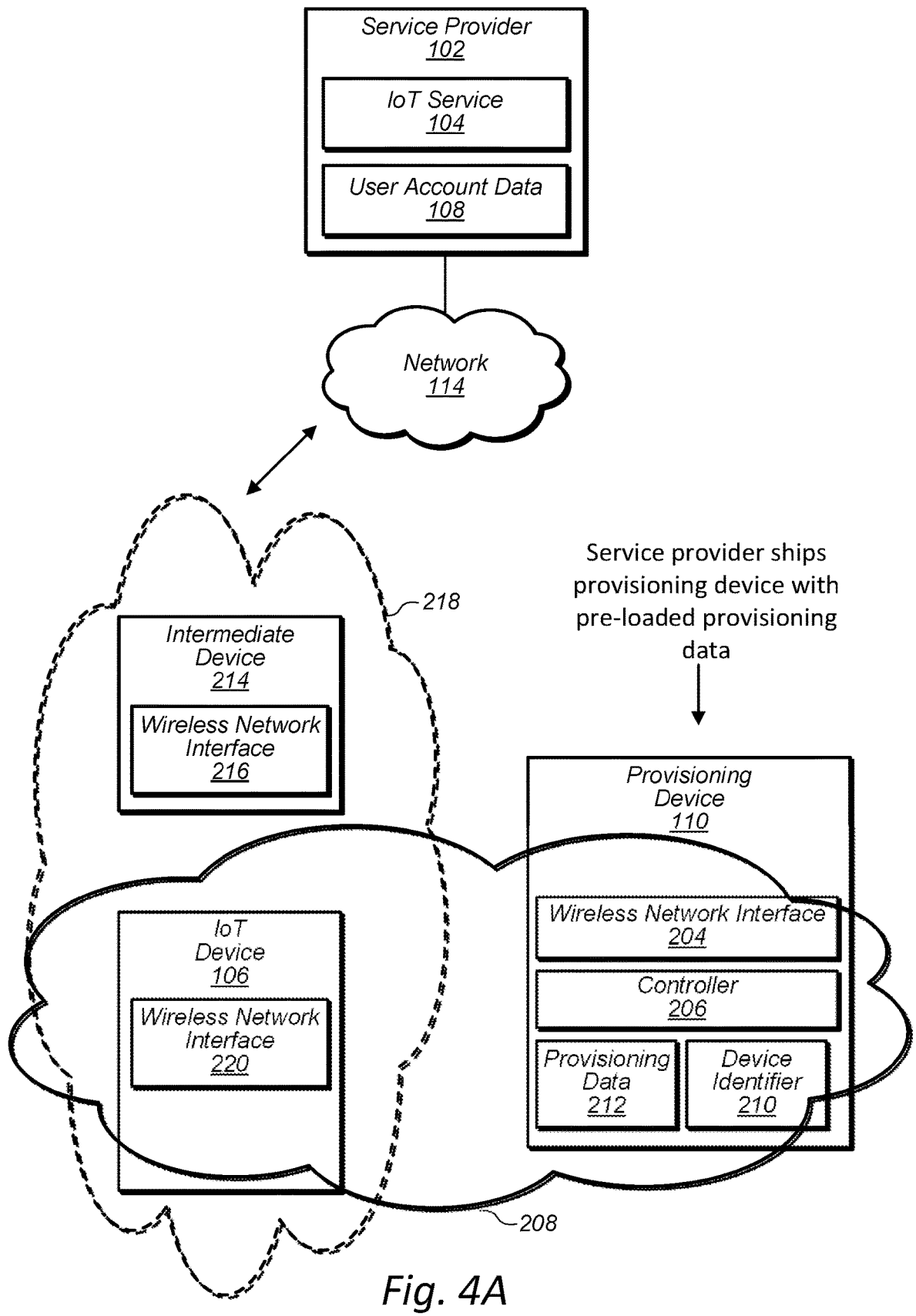
FIG. 4A illustrates a system and a process for provisioning an IoT device using a provisioning device with pre-loaded provisioning data, according to some embodiments.

FIG. 4A illustrates a system and a process for provisioning an IoT device using a provisioning device with pre-loaded provisioning data, according to some embodiments. One or more aspects of the example embodiment of FIGS. 4A-4C may be the same or similar to those described above, such as for FIGS. 2A-2C. In the depicted embodiment, a service provider 102 provides an IoT service 104 that may be used by one or more IoT devices. In embodiments, the service provider 102 stores user account data 108 that includes information for the IoT device 106 and/or information associated with a client that has obtained or purchased the IoT device 106 and/or the IoT service 104.

In the depicted embodiment, the service provider 102 stores provisioning data 212 onto the provisioning device 110 before shipping the provisioning device 110 to a location of the client. Thus, the provisioning device 110 is pre-loaded with the provisioning data 212 that is usable to provision the IoT device 106 to connect to the service provider 102.

In the depicted embodiment, the provisioning device 110 includes a wireless network interface 204 and a controller 206. As discussed above, the wireless network interface 204 may be hardware (e.g., antenna) and/or software for communicating with another device (e.g., IoT device 106) to establish a wireless connection with the other device and the controller 206 may be hardware and/or software (e.g., a processor and/or memory) that causes the provisioning device 110 to perform any of the actions and/or make any of the determinations described with respect to the provisioning device 110. The IoT device 106 may also have a controller. The provisioning device 110 may also include a device identifier 210, as discussed above.

In embodiments, the provisioning device 110 may provide, via the wireless network interface 202, an indication that the provisioning device 110 is available to provision an IoT device (e.g., IoT device 106) to connect to a remote service provider (e.g., service provider 102). As discussed above, the provisioning device 110 may do so by generating a provisioning signal (e.g. a provisioning hotspot signal) that the IoT device 106 may recognize in order to join the provisioning network 208.

In the example embodiment, an intermediate device 214 that is connected to the network 114 (e.g., a router connected to the internet) includes a wireless network interface 216. The wireless network interface 216 may be used to generate a local wireless network signal that a device may recognize in order to join a local wireless network 218.

Figure 4B:
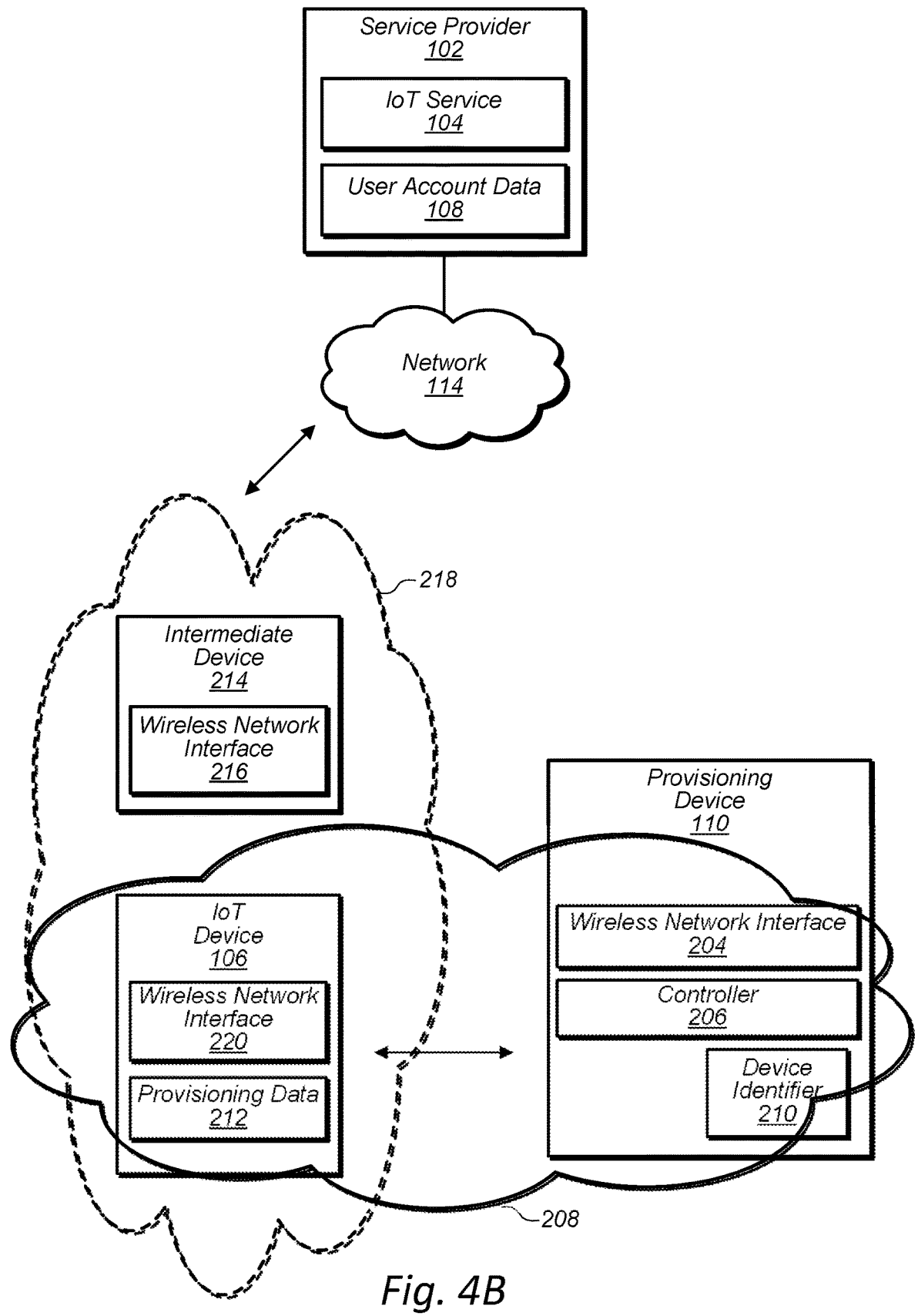
FIG. 4B illustrates a system and a process for provisioning an IoT device using a provisioning device with pre-loaded provisioning data, including transmitting provisioning data to the IoT device, according to some embodiments.

FIG. 4B illustrates a system and a process for provisioning an IoT device using a provisioning device with pre-loaded provisioning data, including transmitting provisioning data to the IoT device, according to some embodiments. In the depicted embodiment, the provisioning device 110 may provide, via the wireless network interface 202, an indication that the provisioning device 110 is available to provision the IoT device 106 to connect to the remote service provider 102. In embodiments, the provisioning device 110 may provide the indication by generating a provisioning signal (e.g. a provisioning hotspot signal) that the IoT device 106 may recognize in order to join the provisioning network 208.

The IoT device 106 may be pre-programmed to search for and to recognize the provisioning signal as a signal unique to devices that are for provisioning the IoT device 106 to connect to a service provider, such as the service provider 102. In response to the IoT device 106 identifying and/or detecting the wireless hotspot of the provisioning device 110, the provisioning device 110 and the IoT device 106 may establish a wireless connection 116 to allow transmission of provisioning data 212 to the IoT device 106 over the wireless connection 116. In embodiments, the provisioning device 110 receives, via the wireless network interface 204, an indication (e.g., a wireless signal) that the IoT device 106 is available to be provisioned to connect to the service provider 102 and in response, transmits the provisioning data 212 to the IoT device 106.

Figure 4C:
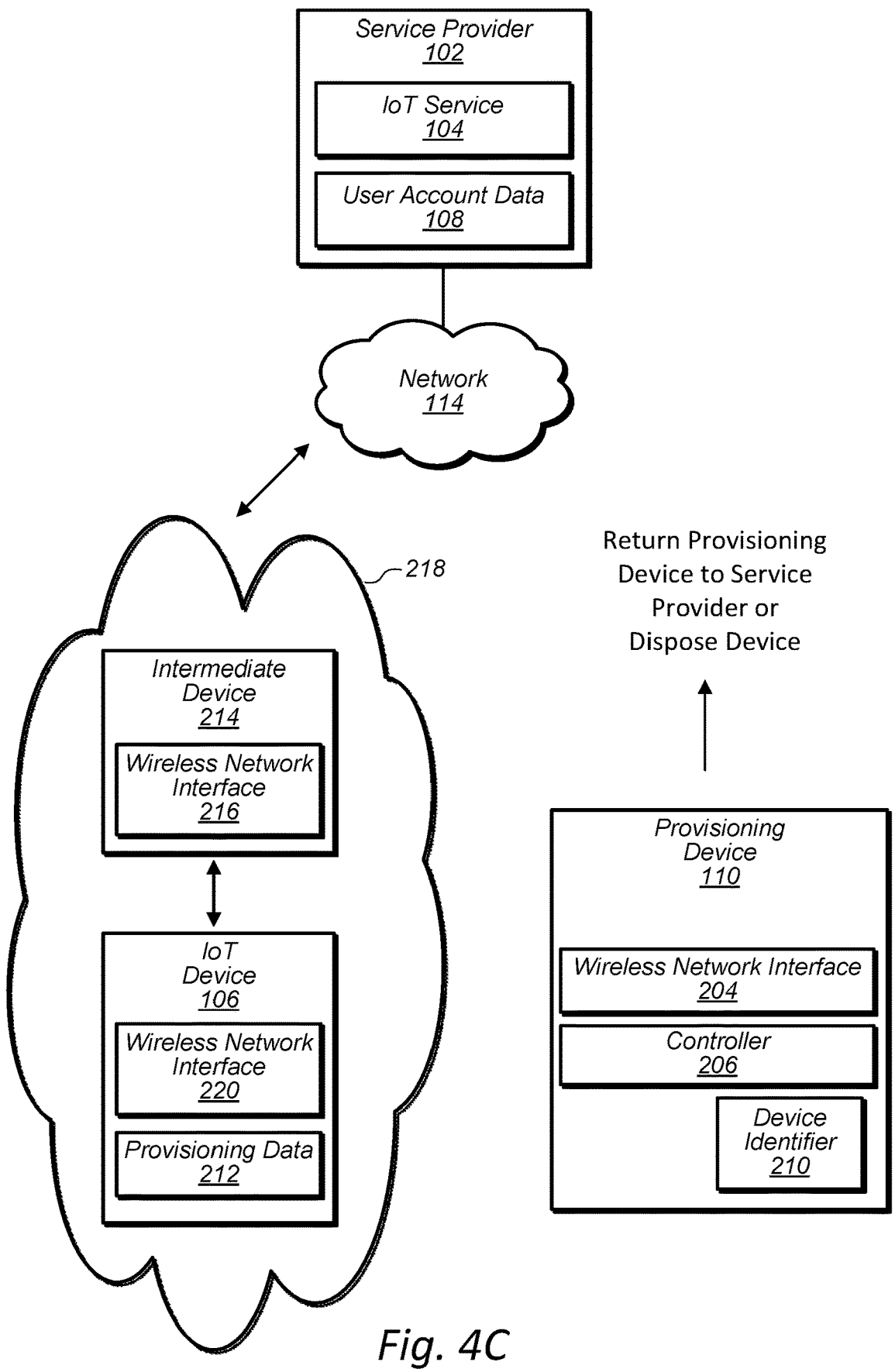
FIG. 4C illustrates a system and a process for provisioning an IoT device using a provisioning device with pre-loaded provisioning data, including connecting the IoT device to a service provider, according to some embodiments.

FIG. 4C illustrates a system and a process for provisioning an IoT device using a provisioning device with pre-loaded provisioning data, including connecting the IoT device to a service provider, according to some embodiments. In the depicted embodiment, the IoT device 106 provides to the intermediate device 214 at least a portion of the provisioning data 212 (e.g., local wife credentials) necessary to join the local wireless network 218 and/or establish a connection with the intermediate device 214.

In the example embodiment, the IoT device 106 may transmit at least the portion of the provisioning data 212 via the wireless network interface 220 and the intermediate device 214 may receive at least the portion of the provisioning data 212 via the wireless network interface 216. In response to authenticating the IoT device based on the received provisioning data, the intermediate device 214 may add the IoT device 106 to the local wireless network 218 and/or establish a connection with the IoT device 106. Thus, the local wireless network 218 is represented with a solid line, to show that the IoT device 106 has joined the local wireless network 218.

As discussed above, subsequent to joining the local wireless network 218 and/or establishing a connection with the intermediate device 214, the IoT device may establish a connection 118 with the service provider 102, based at least on the provisioning data 212. In an embodiment, in response to authenticating the IoT device 106 based at least on the user account information provided by the IoT device 106, the service provider may begin providing one or more IoT services 104 for the IoT device 106. As discussed above, the IoT device 106 may be shipped back to the service provider 102 so it can be recycled for use by another client or the same client. In other cases, the provisioning device 110 may be disposed of and not used again.

Figure 5:
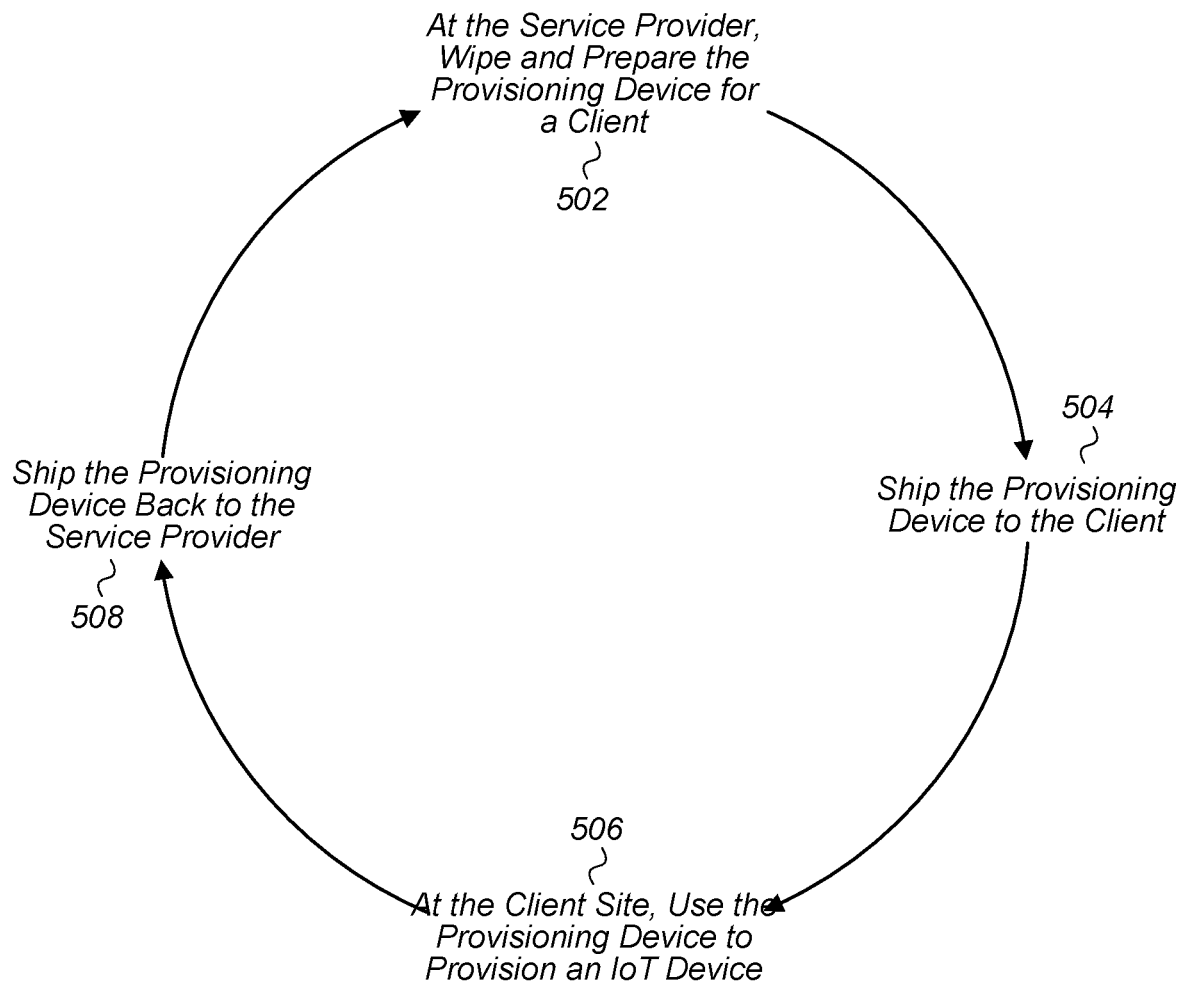
FIG. 5 is a flow diagram of a process for provisioning an IoT device using a reusable provisioning device, according to some embodiments.

FIG. 5 is a flow diagram of a process for provisioning an IoT device using a reusable provisioning device, according to some embodiments. The illustrated process may be performed within the context of a provisioning device 110, the service provider 102 and a client using an IoT device 106. The process is shown as a provisioning lifecycle for a shippable and recyclable provisioning device 110.

At 502, the service provider 102 prepares a provisioning device 110 to provision one or more IoT devices 106 for a client. The provisioning may include wiping and erasing some or all of the provisioning data on the provisioning device 110 that was previously used by another client or the same client. At 504, the service provider ships the provisioning device 110 to the client. At 506, the client uses the provisioning device 110 to provision an IoT device 106 to connect to the service provider 102, as described above in various embodiments. At 508, after the IoT device 106 is provisioned, the client ships the provisioning device 110 back to the service provider 102.

Figure 6:
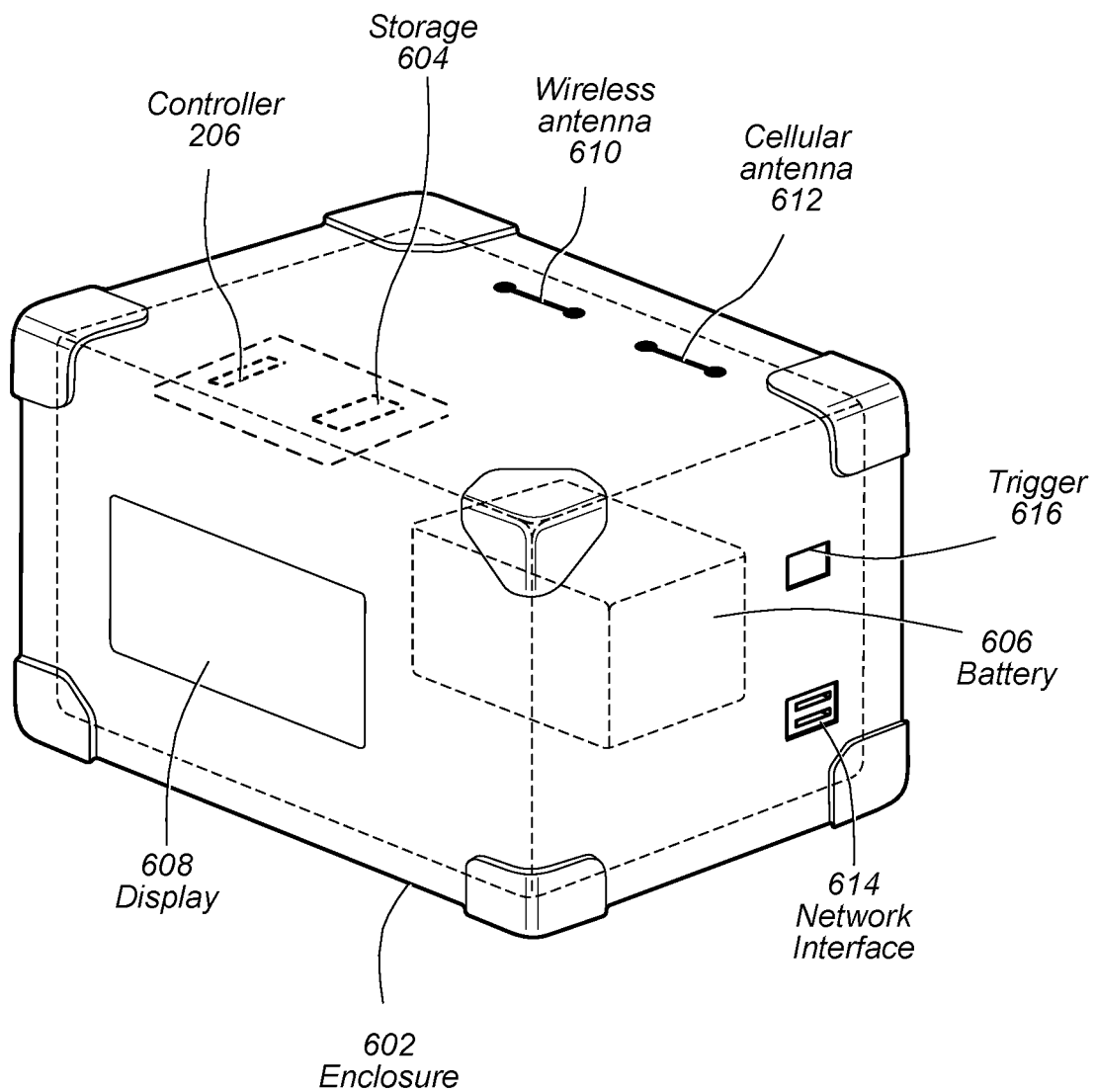
FIG. 6 illustrates a provisioning device, according to some embodiments.

FIG. 6 illustrates a provisioning device, according to some embodiments. The depicted provisioning device 110 may be used to simplify the provisioning of an IoT device 106 for a client. In the depicted embodiment, the provisioning device 110 is shippable and recyclable. The provisioning device 110 includes an enclosure 602 surrounding various components, such as the controller 206, storage 604, and battery 606. In embodiments, the battery may be rechargeable. In other cases, the battery may not be reusable and is disposed after use.

The storage 604 may include any type of persistent storage such as, but not limited to hard disk drives, optical media, magnetic tapes, memristor storage, persistent RAM or solid state storage devices. The enclosure 602 may be ruggedized (e.g., according to various standards, such as military standards or electronics industry standards) and may be configured with an outward-facing electronic display 608 such that the enclosure 602 and the electronic display 608 form a self-contained shipping container suitable for shipping without any additional packaging, labeling or the like and such that the electronic display 608 acts as to display a destination location (e.g., in lieu of a shipping label). In embodiments, the enclosure 602 and the display 608 act as reusable shipping components in lieu of cardboard boxes and shipping labels. In some embodiments, a shipping label with shipping information is applied to the provisioning device 110 instead of using a display 608 for shipping information.

The shippable storage device 100 is illustrated with a wireless antenna 610 and a cellular antenna 612. In embodiments, the wireless network interface 204 may include at least the wireless antenna 610. Similarly, the cellular network interface 202 may include at least the cellular antenna 612. In embodiments, the provisioning device 110 includes a network interface 614 that may be used to physically connect the provisioning device 110 to an IoT device, as described above.

In embodiments, the provisioning device 110 may include a trigger 616. In response to a receiving a trigger input via the trigger 616, the provisioning device 110 may perform a series of one or more of the above actions for provisioning the IoT device 106 to connect to the remote service provider 102. A trigger input may be any suitable action performed on the trigger 616 as an input, and the trigger 616 may be any suitable device for receiving such an input. For example, the trigger may be a button. In some embodiments, the trigger 616 may be a tape or other blocking material that, when removed, provides power to the provisioning device 110 to activate it. In an embodiment, the trigger 616 may include a microphone for accepting voice input.

Figure 7:
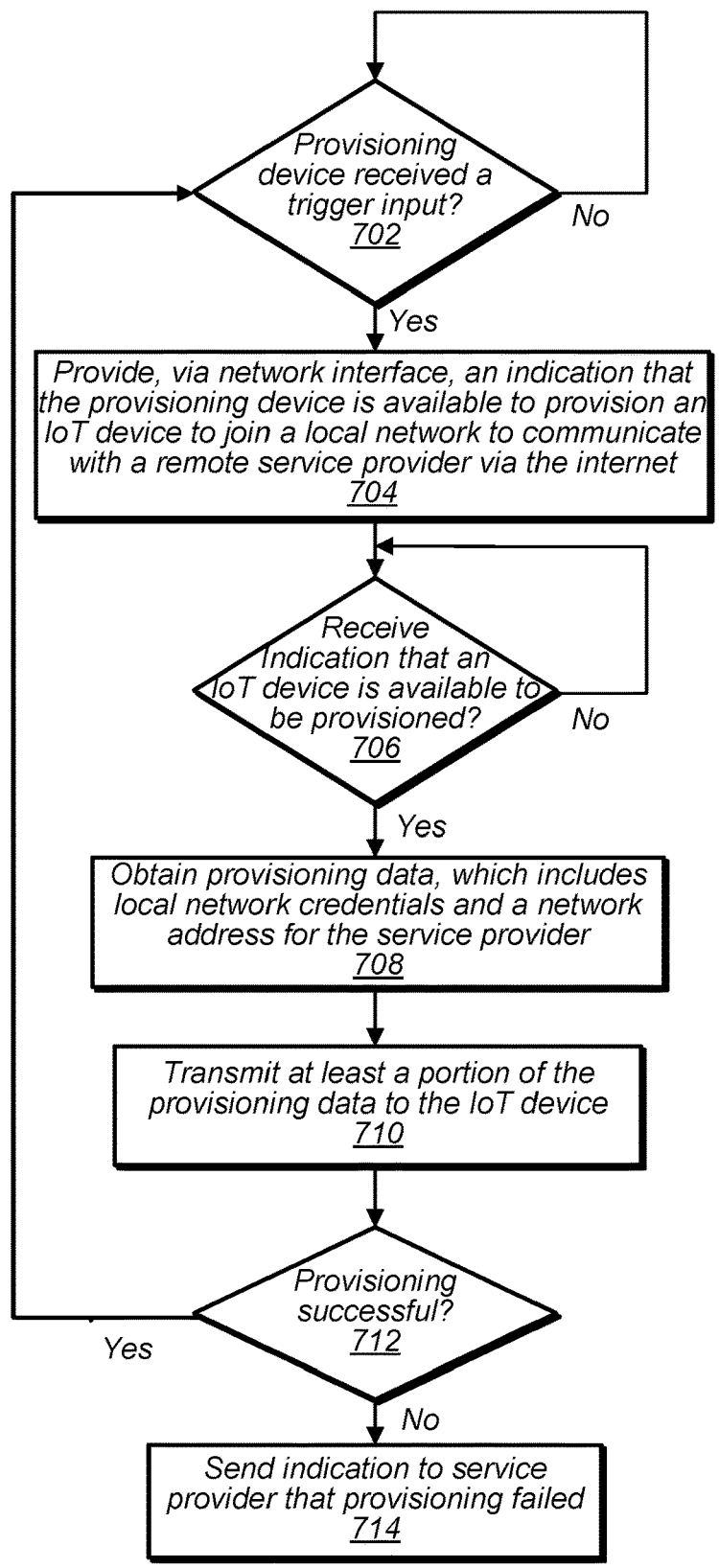
FIG. 7 is a flow diagram of a process for provisioning an IoT device using a provisioning device, according to some embodiments.

FIG. 7 is a flow diagram of a process for provisioning an IoT device using a provisioning device, according to some embodiments. One or more portions of the illustrated process may be performed via one or more components of the provisioning device 110, such as the controller 206, cellular network interface 202, and the wireless network interface 204.

At block 702, a provisioning device 110 determines whether a triggering input was received. In embodiments, a triggering input may be a voice command or a physical action. Examples of physical actions include pressing a button or removing tape to allow a battery to turn on the provisioning device 110. If no triggering input was received, the process returns to block 702.

If the provisioning device 110 determines that a triggering input was received then at block 704, the provisioning device 110 provides, via a network interface, an indication that the provisioning device 110 is available to provision an IoT device 106 to join a local network to communicate with a remote service provider via the internet. At block 706, the compute host 500 determines whether it receives an indication that an IoT device 106 is available to be provisioned. If not, then the process returns to block 706. If the compute host 500 determines that it receives an indication that an IoT device 106 is available to be provisioned, then the process proceeds to block 708.

At block 708, the provisioning device 110 obtains provisioning data 212. The provisioning data 212 may include local network credentials and a network address for the service provider 102. In some embodiments, the provisioning device 110 connects to a service provider and downloads the provisioning data 212. In an embodiment, prior to downloading the provisioning data, the provisioning device 110 provides a device identifier 210 to the service provider 102. The service provider may use the device identifier 210 and/or other user account data to locate the provisioning data 212 for the provisioning device 110 to download.

Next, at block 710, the provisioning device 110 transmits at least a portion of the provisioning data 212 to the IoT device 106. At block 712, the provisioning device 110 determines whether provisioning was successful. If so, then the processes returns to block 702. If not, then at block 714, the provisioning device 110 sends an indication to the service provider 102 indicating that the provisioning of the IoT device 106 failed. In embodiments, the provisioning device 110 makes the above determination based on receiving an indication from the IoT device that provisioning was successful or that provisioning failed. In embodiments, the provisioning device 110 sends to the service provider an indication that the provisioning failed or that the provisioning was successful. In some embodiments, provisioning is successful if the IoT device 106 is able to join a local network and/or communicate with the service provider 102.

Figure 8:
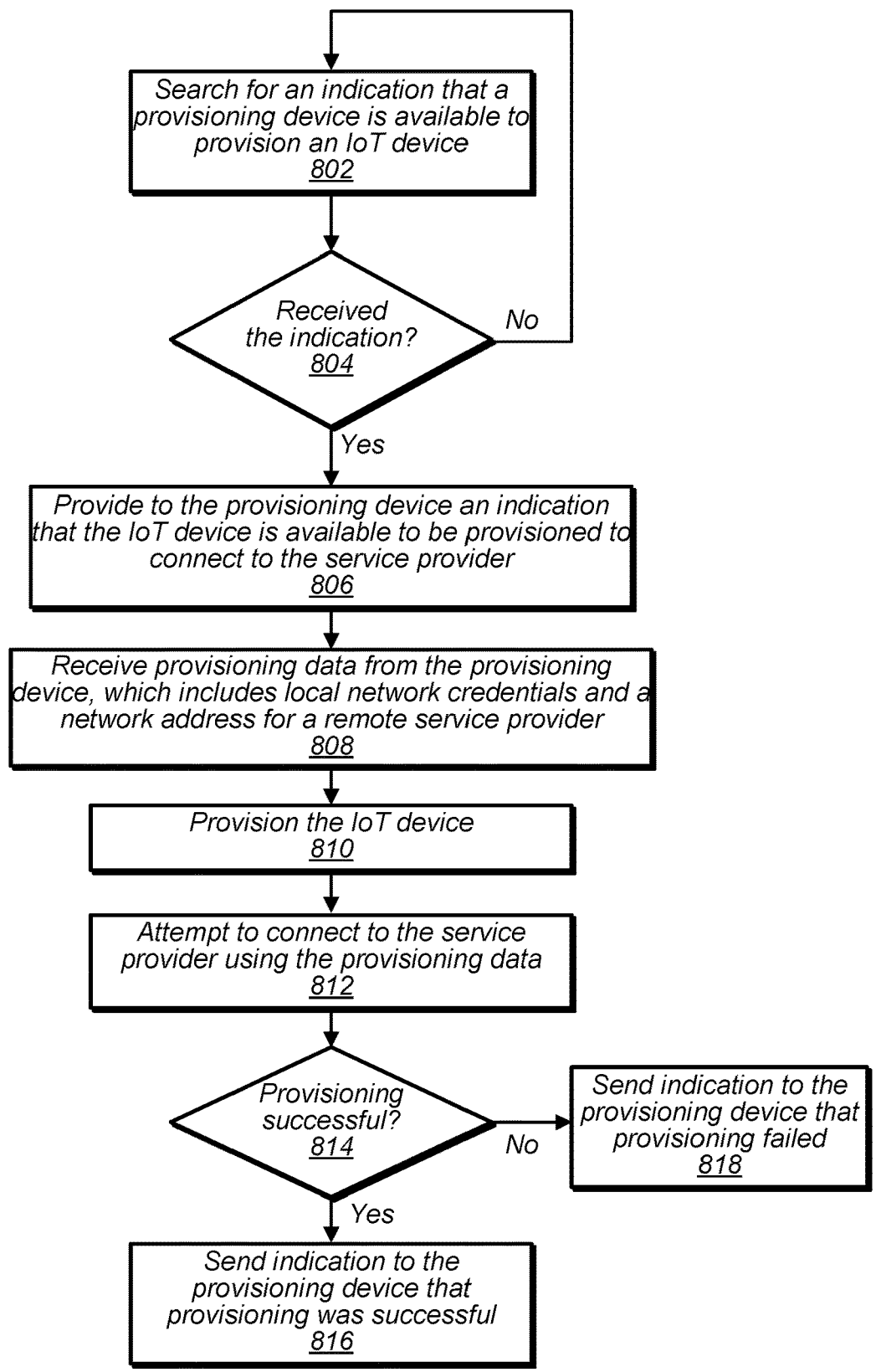
FIG. 8 is a flow diagram of a process for receiving provisioning data from a provisioning device and connecting to a service provider, according to some embodiments.

FIG. 8 is a flow diagram of a process for receiving provisioning data from a provisioning device and connecting to a service provider, according to some embodiments. One or more portions of the illustrated process may be performed via one or more components of the IoT device 106, such as a controller or a wireless network interface 220.

At block 802, the IoT device 106 searches for an indication that a provision device 110 is available to provision an IoT device 106. At block 804, the IoT device 106 determines whether it receives an indication. If not, the process returns to block 802. If so, at block 806, the IoT device 106 provides to the provisioning device 110 an indication that the IoT device 106 is available to be provisioned to connect to a service provider 102 (e.g., to join a local network to communicate with the service provider 102). At block 808, the IoT device 106 receives provisioning data 212 from the provisioning device 110. In embodiments, the provisioning data 212 includes local network credentials and/or a network address for the remote service provider 102. At block 810, controller provisions the IoT device 106. For example, the controller may provision the IoT device 106 to join the local network to communicate with the remote service provider 102 via the internet 114.

At block 812, the IoT device 106 attempts to connect to the service provider using the provisioning data. For example, the IoT device 106 attempts to join the local network (e.g., using network credentials) to communicate with the remote service provider 102 (e.g., using the network address for the remote service provider 102). At block 814, the IoT device 106 determines whether provisioning of the IoT device 106 was successful (e.g., whether the IoT device 106 connected with and/or communicated with the service provider 102). If provisioning was successful, then at block 816, the IoT device 106 sends an indication to the provisioning device indicating that the provisioning was successful. If not, then at step 816, the IoT 818 106 sends an indication to the provisioning device indicating that the provisioning failed.

Figure 9:
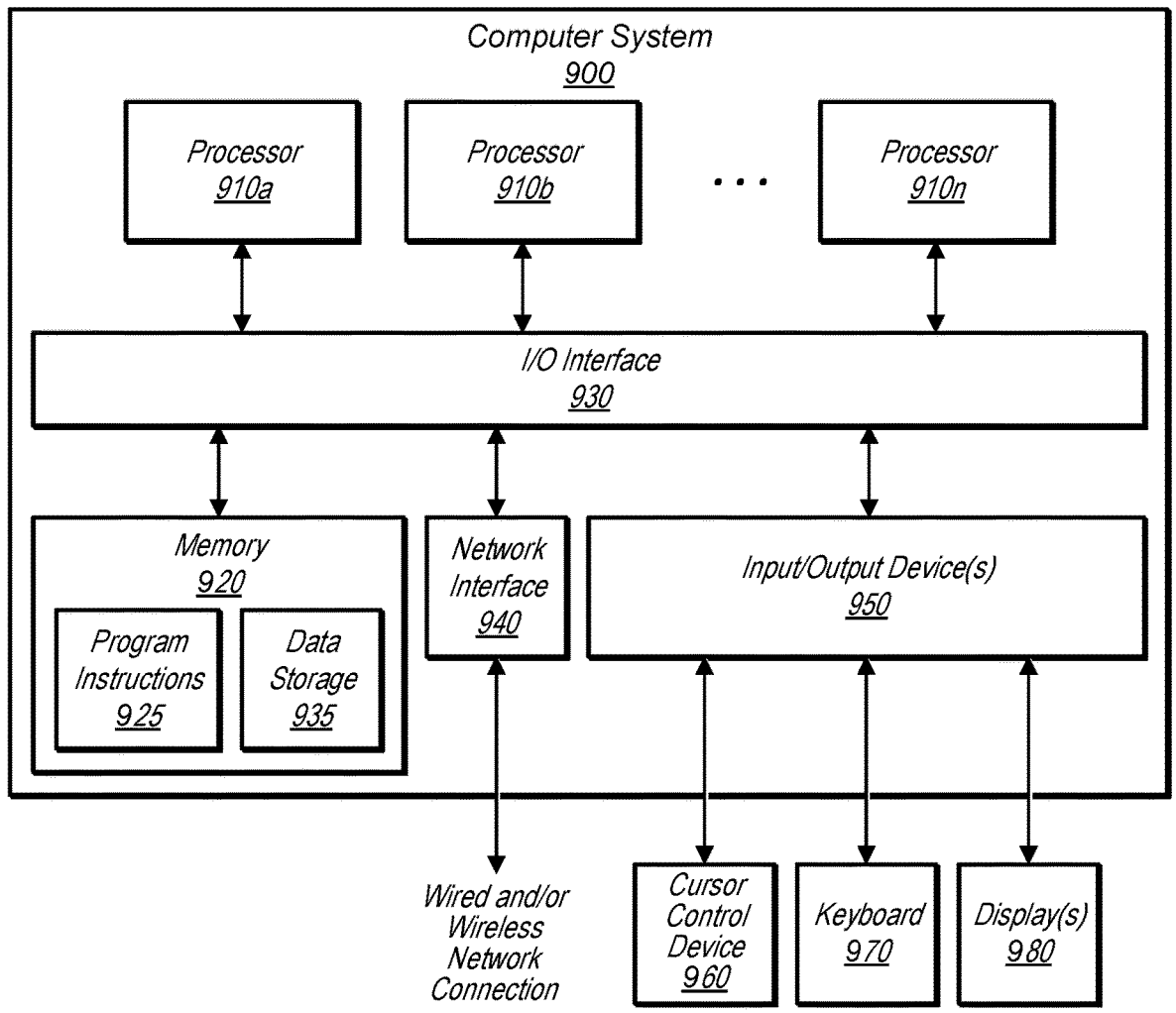
FIG. 9 is a block diagram illustrating an example computer system that implements some or all of the techniques described herein, according to some embodiments.

Any of various computer devices or systems may be configured to implement processes associated with provisioning an IoT device 106. For example, FIG. 9 is a block diagram illustrating one embodiment of a computer system suitable for implementing at least some of the systems and methods described herein. In various embodiments, the provisioning device 110, the IoT device 106, the intermediate device 214, and/or compute hosts at the service provider 102 may each include one or more computer systems 900 such as that illustrated in FIG. 9 or one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 920 as program instructions 925. In some embodiments, system memory 920 may include data 935 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between the shippable storage device 100 and other computer systems, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.7, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. An internet-connectable device, comprising:
a controller, wherein the controller is configured to:
receive connection information from another device, wherein the connection information is usable to provision the internet-connectable device to connect with a local device of a local network to join the local network and to communicate with a remote service provider via the internet, and wherein the connection information is based on connection data for the local network and connection data for the remote service provider pre-loaded onto the other device before shipment to a location of a client of the remote service provider or downloaded onto the other device from a cellular network via a cellular network interface;
provision the internet-connectable device, using the connection data for the local network and the connection data for the remote service provider pre-loaded onto the other device before shipment of the other device to the location of the client or downloaded onto the other device from the cellular network via the cellular network interface, to connect to the local device of the local network to join the local network and to communicate with the remote service provider via the internet; and
connect to the local device and communicate with the remote service provider via the internet.

2. The internet-connectable device as recited in claim 1, wherein the controller is further configured to:
provide a device identifier of the internet-connectable device to the local device.

3. The internet-connectable device as recited in claim 1, wherein the controller is further configured to:
subsequent to the connection to the local device, perform one or more of receive data from the local device or send data to the local device.

4. The internet-connectable device as recited in claim 1, wherein to connect to the local device, the controller is further configured to:
provide at least a portion of the connection information to the local device; and
subsequent to authentication of the internet-connectable device by the local device based on at least the portion of connection information, connect to the local device.

5. The internet-connectable device as recited in claim 1, wherein the controller is further configured to:
subsequent to the connection to the local device, receive one or more commands associated with a particular service of the remote service provider.

6. The internet-connectable device as recited in claim 1, wherein the connection information comprises local network credentials, and wherein the controller is further configured to:
establish a connection between the internet-connectable device and a local wireless network based on the local network credentials, wherein the local device is on the local wireless network.

7. The internet-connectable device as recited in claim 1, wherein the connection information comprises a network address for a remote service provider usable to provision the internet-connectable device to communicate with the remote service provider via the internet, and wherein the controller is further configured to:
transmit data to or receive data from the network address for the remote service provider.

8. A method, comprising:
performing, by an internet-connectable device comprising one or more processors and memory:
receiving connection information from another device, wherein the connection information is usable to provision the internet-connectable device to connect with a local device of a local network to join the local network and to communicate with a remote service provider via the internet, and wherein the connection information is based on connection data for the local network and connection data for the remote service provider pre-loaded onto the other device before shipment to a location of a client of the remote service provider or downloaded onto the other device from a cellular network via a cellular network interface;
provisioning the internet-connectable device, using the connection data for the local network and the connection data for the remote service provider pre-loaded onto the other device before shipment of the other device to the location of the client or downloaded onto the other device from the cellular network via the cellular network interface, to connect to the local device of the local network to join the local network and to communicate with the remote service provider via the internet; and
connecting to the local device and communicate with the remote service provider via the internet.

9. The method as recited in claim 8, further comprising:
providing a device identifier of the internet-connectable device to the local device.

10. The method as recited in claim 8, further comprising:
subsequent to connecting to the local device, performing one or more of receiving data from the local device or sending data to the local device.

11. The method as recited in claim 8, wherein connecting to the local device comprises:
providing at least a portion of the connection information to the local device; and
subsequent to authentication of the internet-connectable device by the local device, connecting to the local device.

12. The method as recited in claim 8, wherein the connection information comprises local network credentials, and wherein the method further comprises:
establishing a connection between the internet-connectable device and a local wireless network based on the local network credentials.

13. The method as recited in claim 8, further comprising:
receiving user account information from the source external to the internet-connectable device; and
subsequent to connecting to the local device, transmitting the user account information to the remote service provider.

14. The method as recited in claim 13, further comprising:
subsequent to transmitting the user account information to the remote service provider, receiving one or more commands from the remote service provider.

15. One or more non-transitory computer-accessible storage media storing program instructions that when executed on or across one or more processors of an internet-connectable device cause the one or more processors to:
receive connection information from another device, wherein the connection information is usable to provision the internet-connectable device to connect with a local device of a local network to join the local network and to communicate with a remote service provider via the internet, and wherein the connection information is based on connection data for the local network and connection data for the remote service provider pre-loaded onto the other device before shipment to a location of a client of the remote service provider or downloaded onto the other device from a cellular network via a cellular network interface;
provision the internet-connectable device, using the connection data for the local network and the connection data for the remote service provider pre-loaded onto the other device before shipment of the other device to the location of the client or downloaded onto the other device from the cellular network via the cellular network interface, to connect to the local device of the local network to join the local network and to communicate with the remote service provider via the internet; and
connect to the local device and communicate with the remote service provider via the internet.

16. The one or more storage media as recited in claim 15, further comprising program instructions that when executed on or across the one or more processors further cause the one or more processors to:
provide a device identifier of the internet-connectable device to the local device.

17. The one or more storage media as recited in claim 15, further comprising program instructions that when executed on or across the one or more processors further cause the one or more processors to:
subsequent to the connection to the local device, perform one or more of receiving data from the local device or sending data to the local device.

18. The one or more storage media as recited in claim 15, wherein to connect to the local device, the program instructions when executed on or across the one or more processors cause the one or more processors to:

provide at least a portion of the connection information to the local device; and subsequent to authentication of the internet-connectable device by the local device based on at least the portion of connection information, connect to the local device.

19. The one or more storage media as recited in claim 15, further comprising program instructions that when executed on or across the one or more processors further cause the one or more processors to:

subsequent to the connection to the local device, receive one or more commands associated with a particular service of the remote service provider.

20. The one or more storage media as recited in claim 15, wherein the connection information comprises local network credentials, and further comprising program instructions that when executed on or across the one or more processors further cause the one or more processors to:

establish a connection between the internet-connectable device and a local wireless network based on the local network credentials, wherein the local device is on the local wireless network.

* * * * *